(12) United States Patent
Murakami et al.

(10) Patent No.: US 7,796,762 B2
(45) Date of Patent: Sep. 14, 2010

(54) COMMUNICATION SYSTEM, COMMON KEY CONTROL APPARATUS, AND GENERAL COMMUNICATION APPARATUS

(75) Inventors: Takashi Murakami, Kyoto (JP); Yasuyuki Shintani, Hyogo (JP)

(73) Assignee: Panasonic Corporation, Osaka (JP)

( * ) Notice: Subject to any disclaimer, the term of this patent is extended or adjusted under 35 U.S.C. 154(b) by 1161 days.

(21) Appl. No.: 10/578,888

(22) PCT Filed: Apr. 26, 2005

(86) PCT No.: PCT/JP2005/007894
§ 371 (c)(1),
(2), (4) Date: May 11, 2006

(87) PCT Pub. No.: WO2005/107139
PCT Pub. Date: Nov. 10, 2005

(65) Prior Publication Data
US 2007/0071242 A1 Mar. 29, 2007

(30) Foreign Application Priority Data
Apr. 28, 2004 (JP) .............................. 2004-133100

(51) Int. Cl.
*H04L 9/00* (2006.01)
*H04L 9/08* (2006.01)
*H04L 9/32* (2006.01)
(52) U.S. Cl. .................... 380/278; 380/277; 713/171
(58) Field of Classification Search ......... 380/277–279; 705/71
See application file for complete search history.

(56) References Cited

U.S. PATENT DOCUMENTS

| 6,711,264 B1 * | 3/2004 | Matsumoto et al. | 380/283 |
| 2004/0081320 A1 * | 4/2004 | Jordan et al. | 380/247 |

FOREIGN PATENT DOCUMENTS

| JP | 11-239125 | 8/1999 |
| JP | 2003-101533 | 4/2003 |

* cited by examiner

*Primary Examiner*—Minh Dieu Nguyen
(74) *Attorney, Agent, or Firm*—Wenderoth, Lind & Ponack, L.L.P.

(57) ABSTRACT

When a common key is updated to a new common key, it is possible to prevent the generation of a period during which not all the general communication apparatuses are enabled to make mutual communications using encrypted data while at the same time reducing the memory consumption of the general communication apparatus. A common key control apparatus 11 transmits a first status transition request R1 to all the general communication apparatuses when all the general communication apparatuses 12 made a transition to a distribution completed status, and transmits a second status transition request R2 to all the general communication apparatuses when all the general communication apparatuses 12 made a transition to an in-transit status. The general communication apparatus 12 makes a transition from the update completed status to the distribution completed status upon receipt of a new common key from the common key control apparatus 11, while it makes a transition from the distribution completed status to the in-transit status upon receipt of the first status transition request and it restores the state to the update completed status from the in-transit status upon receipt of the second status transition request.

18 Claims, 8 Drawing Sheets

| COMMON KEY | ADDRESS OF DISTRIBUTION DESTINATION |
|---|---|
| MOST RECENT COMMON KEY | ADDRESS A, ADDRESS B, ADDRESS C ··· |
| COMMON KEY 1 | ADDRESS D |
| COMMON KEY 2 | ADDRESS E, ADDRESS F |
| COMMON KEY 4 | ADDRESS G |
| ⋮ | ⋮ |
| COMMON KEY n | ADDRESS T |

COMMUNICATION SYSTEM, COMMON KEY CONTROL APPARATUS, AND GENERAL COMMUNICATION APPARATUS

TECHNICAL FIELD

The present invention relates to a technique for updating a common key held in a general communication apparatus to a new common key.

BACKGROUND ART

According to Patent Document 1, in order to specify a common key used for encryption, data is transmitted to an apparatus at the transmission destination by appending a common key number to a non-encrypted portion of transmission data. Meanwhile, upon receipt of the data, the apparatus at the transmission destination decrypts the data by selecting the common key to be used for decryption from the common key number appended to the reception data. An apparatus authentication management system disclosed therein therefore enables communications between the transmission source and the transmission destination using the same common key, and the system is capable of preventing an event that communications between apparatuses are disabled in a case where the expiration date of the common key ends at different times.

Patent Document 1: JP-A-2003-101533

DISCLOSURE OF THE INVENTION

In the apparatus authentication management system disclosed in Patent Document 1, however, the apparatus needs to hold a history of common keys distributed in the past. Hence, when the apparatus is one of white goods or a sensor having a small memory capacity, there is a problem that it is difficult to hold the history.

Further, when a network is constructed using apparatuses each capable of holding only one distributed common key due to the incapability of managing the history of common keys because of its small memory capacity, another problem arises.

More specifically, in a case where there are plural apparatuses linked to the network, when all the apparatuses update the common key held in each, there is generated a period during which both an apparatus holding a new common key, which is a common key after the update, and an apparatus holding the old common key, which is the common key before the update, are present depending on the sequence of updating the common key. This gives rise to a problem that communications using encrypted data are disabled between the apparatus holding the new common key and the apparatus holding the old common key during this period.

An object of the invention is to provide a communication system, a general communication apparatus, and a common key control apparatus each capable of preventing the generation of a period, during which not all the general communication apparatuses are enabled to make mutual communications using encrypted data, when the common key is updated to a new common key while suppressing the memory consumption of the general communication apparatus.

A communication system of the invention includes plural general communication apparatuses each holding an old common key before an update and a common key control apparatus that is connected to each general communication apparatus via a certain network and updates the old common key to a new common key. The communication system is characterized in that the common key control apparatus includes: data transmission processing means for transmitting a first status transition request to all general communication apparatuses having made a transition to a distribution completed status, and transmitting a second status transition request to all the general communication apparatuses when the new common key has been distributed to all the general communication apparatuses, and that each general communication apparatus includes: transition means for causing a transition to take place from an update completed status to the distribution completed status upon receipt of the new common key from the common key control apparatus, causing a transition to take place from the distribution completed status to the in-transit status upon receipt of the first status transition request, and restoring the status to the update completed status from the in-transit status upon receipt of the second status transition request; common key holding means for holding a most recent common key alone during the update completed status, and holding both the old common key and the new common key during the distribution completed status and the in-transit status; and encryption means for encrypting data using the most recent common key during the update completed status, encrypting transmission data using the old common key during the distribution completed status, and encrypting the transmission data using the new common key during the in-transit status.

In the communication system of the invention, upon receipt of the new common key from the common key control apparatus, the general communication apparatus makes a transition from the update completed status to the distribution completed status. Herein, all the general communication apparatuses cannot receive the new common key simultaneously. Hence, both a general communication apparatus in the update completed status and a general communication apparatus in the distribution completed status are present on the network. For ease of description, this state of the network is referred to as a first network state.

In the first network state, the general communication apparatus in the distribution completed status encrypts transmission data using the old common key. Nevertheless, because the general communication apparatus in the update completed status holds the old common key, it is able to decrypt the transmission data.

Also, in the first network state, the general communication apparatus in the update completed status encrypts transmission data using the old common key. Nevertheless, because the general communication apparatus in the distribution completed status holds the old common key, it is able to decrypt the transmission data.

Consequently, in the first network state, all the general communication apparatuses are able to transmit and receive encrypted data mutually.

The common key control apparatus transmits the first status transition request to all the general communication apparatuses having made a transition to the distribution completed status. Upon receipt of the first status transition request, each general communication apparatus makes a transition from the distribution completed status to the in-transit status. Herein, all the general communication apparatuses cannot receive the first status transition request simultaneously. Hence, both a general communication apparatus in the distribution completed status and a general communication apparatus in the in-transit status are present on the network. For ease of description, this state is referred to as a second network state.

In the second network state, the general communication apparatus in the in-transit status encrypts transmission data using the new common key. Nevertheless, because the general communication apparatus in the distribution completed status holds both the new common key and the old common key, it is able to decrypt the transmission data.

Meanwhile, the general communication apparatus in the distribution completed status encrypts transmission data using the old common key. Nevertheless, because the general communication apparatus in the in-transit status also holds both the new common key and the old common key, it is able to decrypt the transmission data. Consequently, all the general communication apparatuses are able to make mutual communications also in the second network state.

When all the communication apparatuses made a transition to the in-transit status, the common key control apparatus transmits the second status transition request to all the general communication apparatuses on the network. Upon receipt of the second status transition request, each general communication apparatus is restored to the update completed status from the in-transit status, and deletes the old common key.

Herein, all the communication apparatuses cannot receive the second status transition request simultaneously. Hence, both a general communication apparatus in the in-transit status and a general communication apparatus in the update completed status are present on the network. For ease of description, this state is referred to as a third network state.

In the third network state, because both the general communication apparatus in the in-transit status and the general communication apparatus in the update completed status encrypt transmission data using the new common key, the general communication apparatus having received the transmission data is able to decrypt the transmission data. Consequently, all the general communication apparatuses are able to receive encrypted data also in the third network state.

All the general communication apparatuses are thus able to decrypt the encrypted data in any of the first through third network states; moreover, because the old common key is deleted when all the general communication apparatuses are restored to the update completed status, it is possible to prevent the generation of a period during which not all the general communication apparatuses are enabled to make mutual communications using encrypted data while at the same time reducing the memory consumption.

BRIEF DESCRIPTION OF THE DRAWINGS

FIGS. 4A to 4D are views showing a common key update sequence; FIG. 4A shows the common key update sequence, FIG. 4B shows a status of the general communication apparatus.

BEST MODE FOR CARRYING OUT THE INVENTION

Hereinafter, one embodiment of the invention will be described with reference to the drawings.

Figure 1:
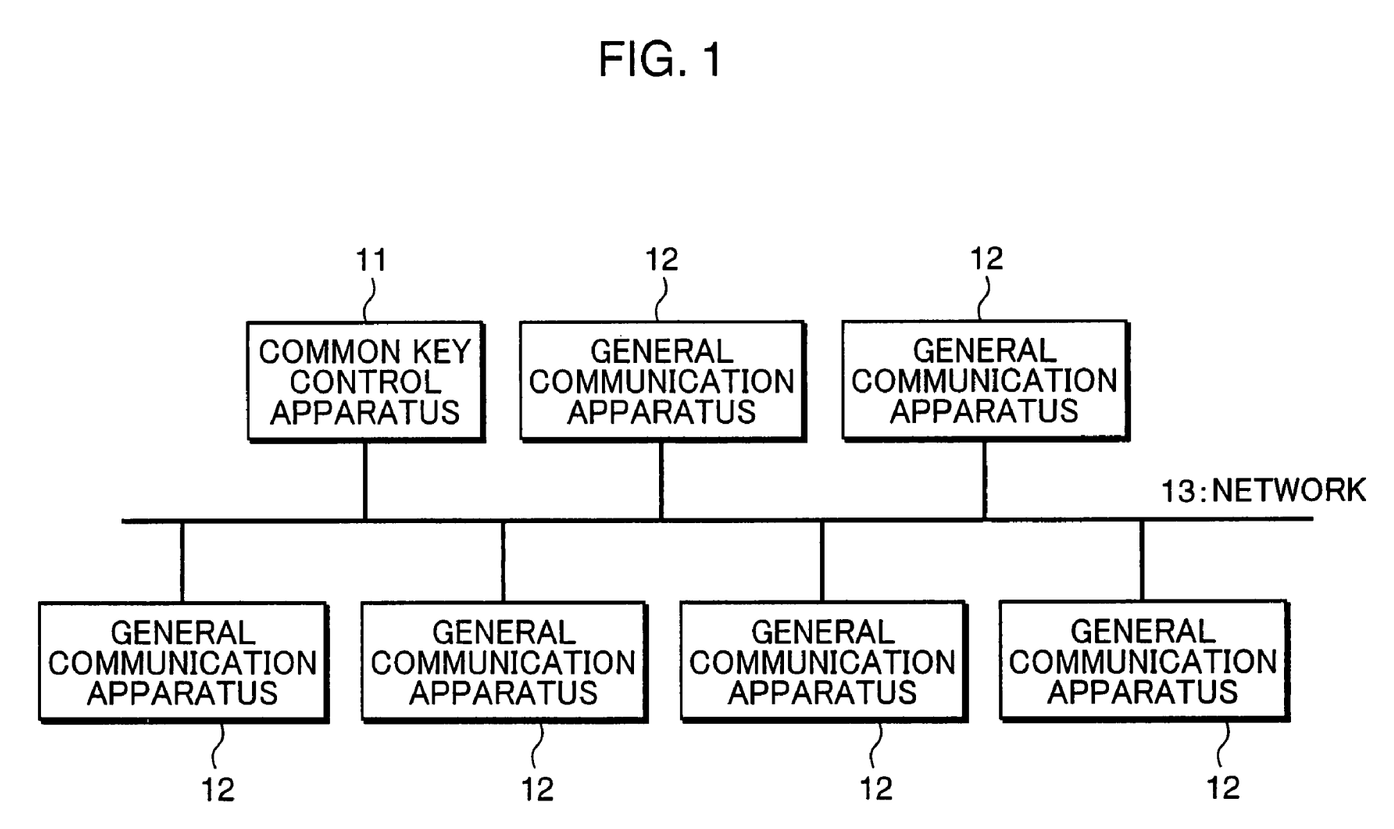
FIG. 1 is a view showing the overall configuration of a communication system according to one embodiment of the invention.

FIG. 1 is a view showing the overall configuration of a communication system according to one embodiment of the invention. The communication system includes a common key control apparatus 11 and plural general communication apparatuses 12. The common key control apparatus 11 and the general communication apparatuses 12 are interconnected via a network 13 to enable mutual transmission and reception of various kinds of data.

The common key control apparatus 11 includes a CPU, a ROM, a RAM, a communication device, etc. It transmits a common key to the general communication apparatuses 12, and manages common keys transmitted to each general communication apparatus 12, a history of the common keys transmitted to each general communication apparatus 12, statuses of the general communication apparatuses 12, etc.

The common key referred to herein is data used to encrypt and decrypt data to be processed in the general communication apparatuses 12 and the common key control apparatus 11 forming the communication system. Statues of each general communication apparatus 12 include "non-set", "distribution completed", "in transit", and "update completed".

"Non-set" is the status indicating a status where a common key has not been transmitted from the common key control apparatus 11. "Distribution completed" is the status to which a transition takes place upon receipt of a new common key from the common key control apparatus 11 as a common key to which the subject is updated. "In transit" is a status to which a transition takes place upon receipt of a first status transition request described below from the common key control apparatus 11. "Update completed" indicates a status to which a transition takes place upon receipt of a second status transition request described below from the common key control apparatus 11.

The network 13 is a network in compliance with the ECHONET standard, a network in compliance with the IEEE802.11b (a kind of wireless LAN) standard, a network in compliance with the Ethernet (registered trademark) standard, etc.

Figure 2:
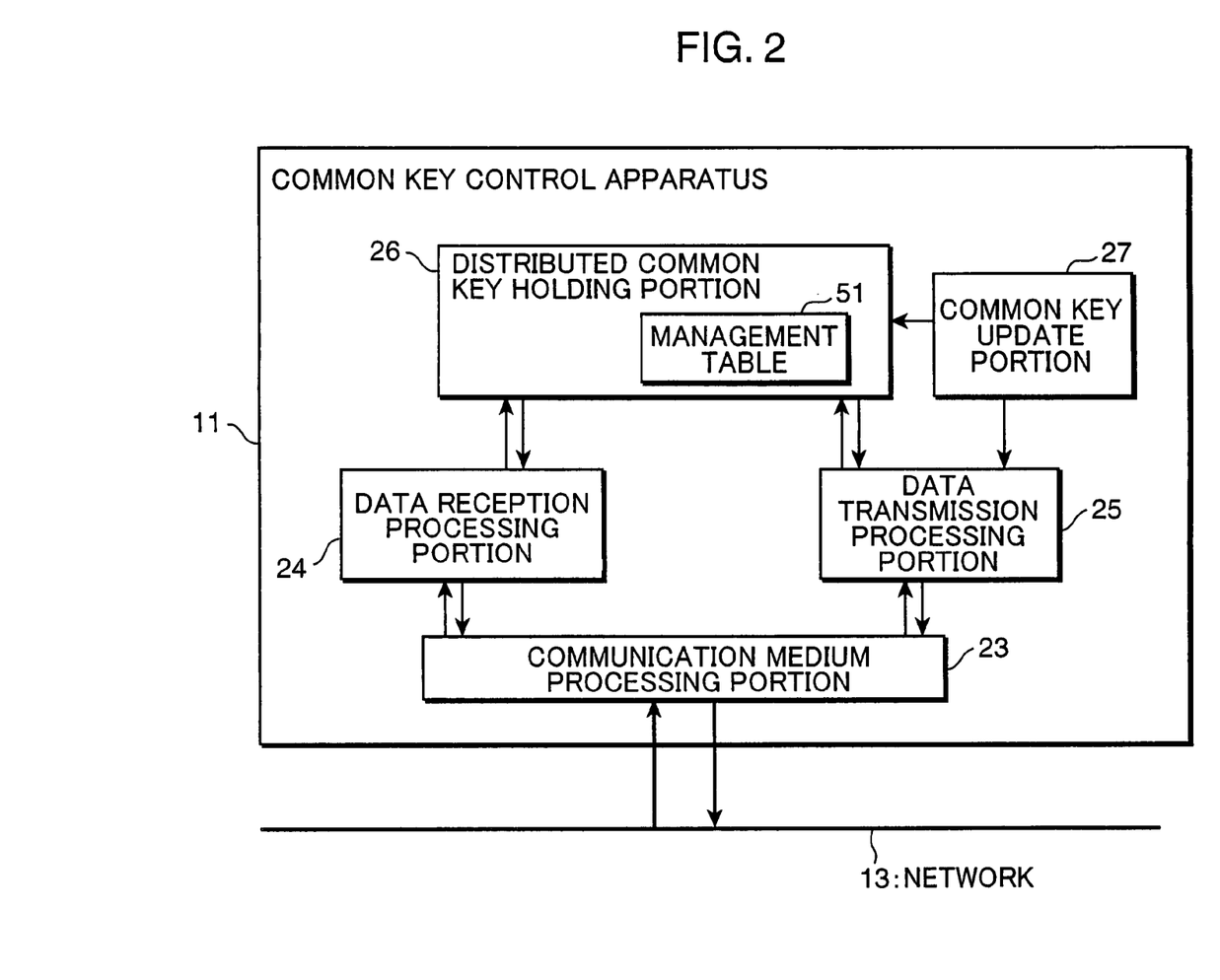
FIG. 2 is a block diagram showing the configuration of a common key control apparatus.

FIG. 2 is a block diagram showing the configuration of the common key control apparatus 11 shown in FIG. 1. The common key control apparatus 11 includes a communication medium processing portion 23, a data reception processing portion 24, a data transmission processing portion 25, a distributed common key holding portion 26, and a common key update portion 27.

The communication medium processing portion 23 transmits transmission data to the network 13 and receives reception data from the network 13.

The data reception processing portion 24 receives a common key that was used to encrypt reception data from the distributed common key holding portion 26 upon receipt of the reception data from the communication medium processing portion 23, and decrypts the reception data.

The data transmission processing portion 25 receives a common key that has been transmitted from the distributed common key holding portion 26 to a general communication apparatus 12 at the transmission destination of the transmission data, and encrypts the transmission data to deliver the encrypted data to the communication medium processing portion 23. It should be noted that the data transmission processing portion 25 does not specify the transmission destination. For example, when transmission data is transmitted by broadcasting or multicasting, the data transmission communication portion 25 receives the most recent common key among common keys transmitted from the distributed common key holding portion 26 to the general communication apparatus 12, and encrypts the transmission data to deliver the encrypted data to the communication medium processing portion 23.

The distributed common key holding portion 26 holds a management table 51 that stores the kinds of common keys transmitted to each general communication apparatus 12. The management table 51 will be described in detail below. The distributed common key holding potion 26 also holds all the common keys transmitted to each general communication apparatus 12. When the data reception processing portion 24 receives reception data, the distributed common key holding portion 26 specifies the common key held in the general communication apparatus 12 at the transmission source by referring to the management table 51, and delivers the common key thus specified to the data reception processing portion 24.

Also, when the data transmission processing portion 25 transmits the transmission data, the distributed common key holding portion 26 delivers the common key held in the general communication apparatus 12 at the transmission destination to the data transmission processing portion 25. Further, when the communication medium processing portion 23 receives data requesting to update the common key from the general communication apparatus 12, the distributed common key holding portion 26 controls the data transmission processing portion 25 and the communication medium processing portion 23 so that the most recent common key is transmitted to the general communication apparatus 12 at the transmission source. The common key update portion 27 generates a new common key when the common keys held in the respective general communication apparatuses 12 are updated to the new common key, and controls the data transmission processing portion 25 and the communication medium processing portion 23 so that the new common key is transmitted to each general communication apparatus 12.

It should be noted that the common key update portion 27 generates a common key using, for example, a random number. Timing at which the common key is updated includes, for example, timings as follows: (1) when the system user makes an update command manually on the screen or the main body of the common key control apparatus 11; (2) when the number of encryptions of transmission data using the old common key has reached a specific number of times; (3) when the number of decryptions of reception data using the old common key has reached a specific number of times; (4) when a sum of the number of encryptions of transmission data using the old common key and the number of decryptions of transmission data using the old common key has reached a specific number of times; (5) when a specific time has passed since the old common key was transmitted; (6) when data is received from a general communication apparatus 12 that is not managed by the distributed common key holding portion 26, and so forth.

Figure 3:
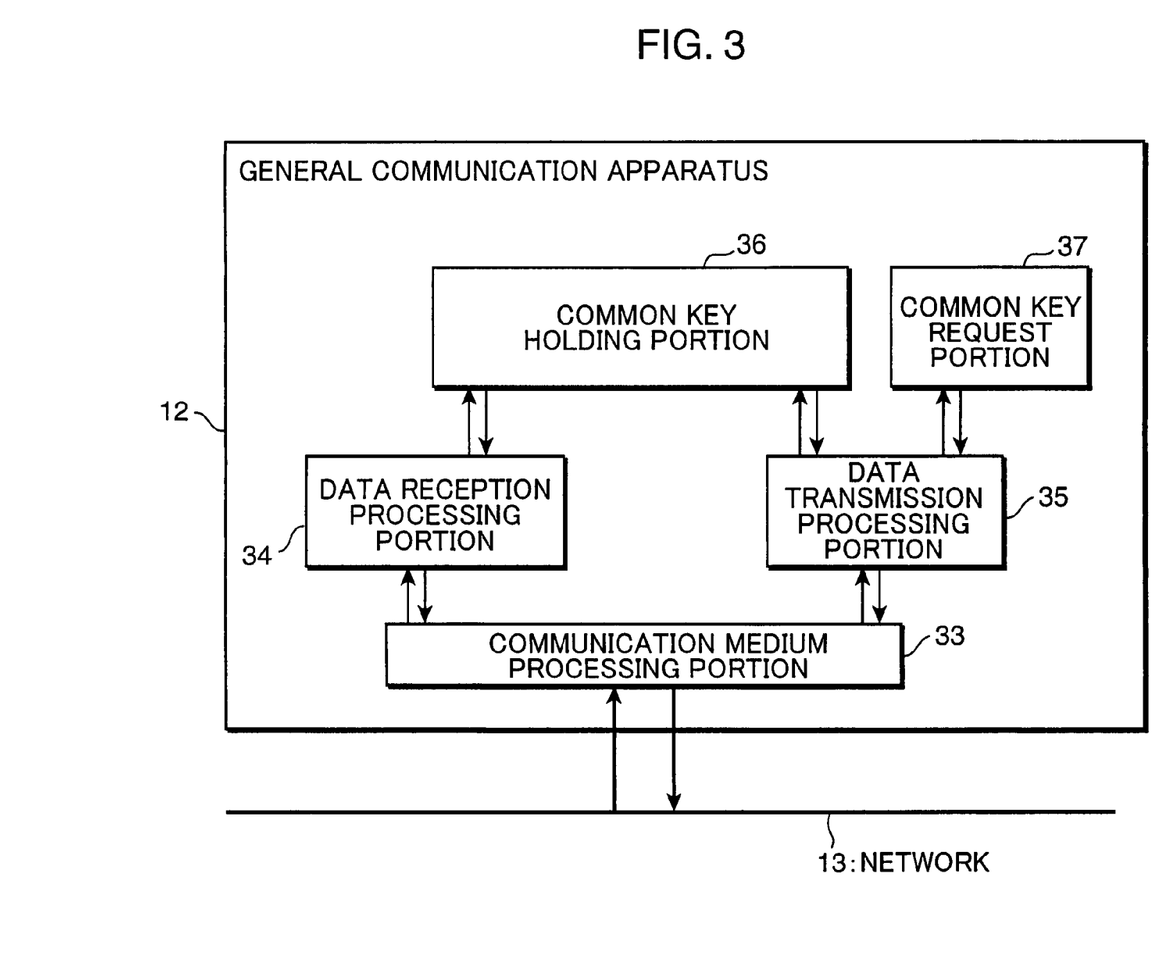
FIG. 3 is a block diagram showing the configuration of a general communication apparatus.

FIG. 3 is a block diagram showing the configuration of the general communication apparatus 12. The general communication apparatus 12 includes a communication medium processing portion 33, a data reception processing portion 34, a data transmission processing portion 35, a common key holding portion 36, and a common key request portion 37.

The communication medium processing portion 33 transmits transmission data to the network 13, and receives reception data from the network 13. Upon receipt of the reception data from the communication medium processing portion 33, the data reception processing portion 34 receives the common key determined by its own status from the common key holding portion 36, and decrypts the reception data. The data transmission processing portion 35 receives the common key determined by its own status from the common key holding portion 36, and encrypts the transmission data to deliver the encrypted data to the communication medium processing apparatus 33. The common key holding portion 36 holds its own status and the common key, and delivers the common key determined by the status to the data reception processing portion 34 and the data transmission processing portion 35.

To be more specific, when its own status is the update completed status, the common key holding portion 36 holds the most recent common key alone, and when its own status is the distribution completed status or the in-transit status, it holds both the new common key and the old common key.

The common key request portion 37 requests the common key control apparatus 11 to transmit the new common key when a general communication apparatus 12 that has been deaccessed from the network 13 due to the switching OFF of the power supply or for any other reason accesses the network 13. This configuration avoids an event that the update to the new common key is left out.

In this embodiment, the data transmission processing portion 25 in the common key control apparatus 11 corresponds to data transmission processing means, and the common key update portion 27 corresponds to common key update means. Also, the common key holding portion 36 in the general communication portion 12 corresponds to transition means and common key holding means, and the data transmission processing portion 35 corresponds to encryption means.

As is shown in FIG. 1, in a case where the communication system comprises plural general communication apparatuses 12, when the common key control apparatus 11 transmits the new common key, there will be a general communication apparatus 12 holding the old common key and a general communication apparatus 12 holding the new common key within the communication system. A common key update sequence to enable communications between the general communication apparatus 12 holding the new common key and the general communication apparatus 12 not holding the new common key is therefore shown in FIGS. 4A to 4D.

Figures 4A, 4B:
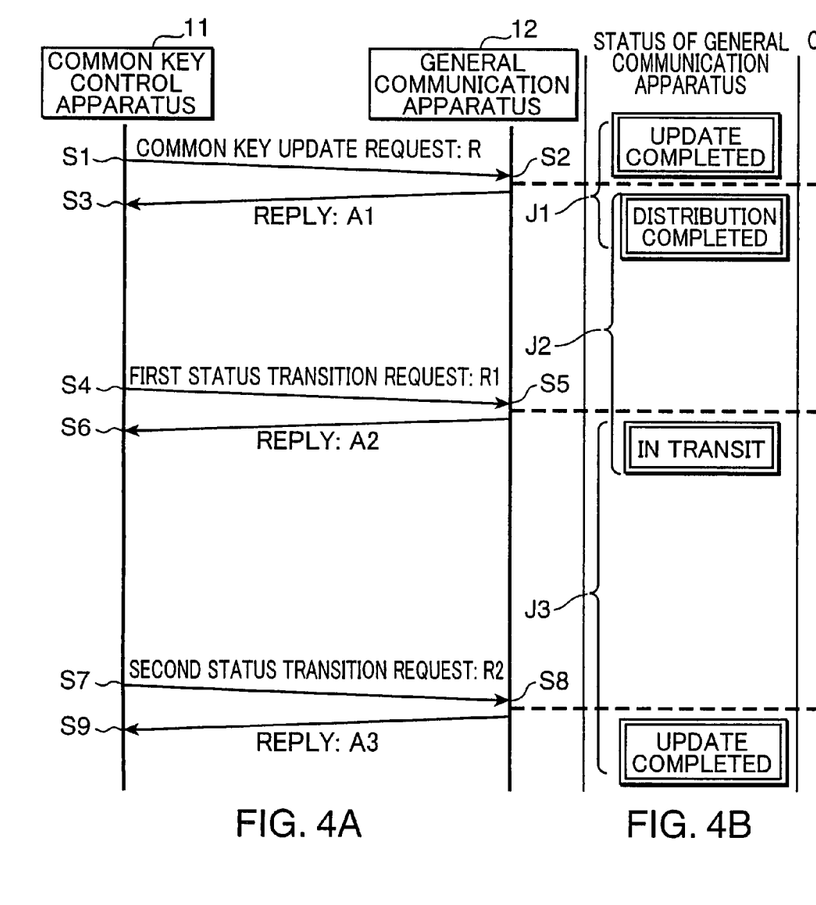
Figure 4C:
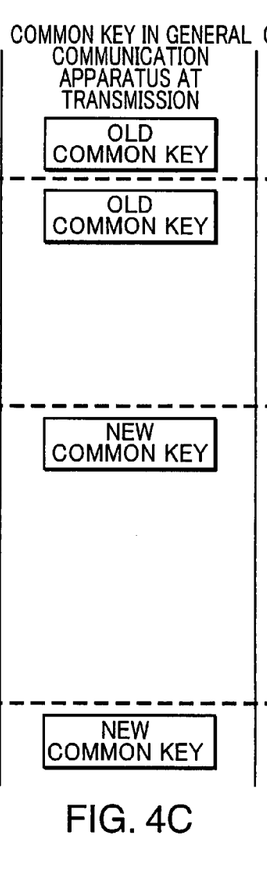
FIG. 4C shows a common key used when the general communication apparatus encrypts transmission data.
Figure 4D:
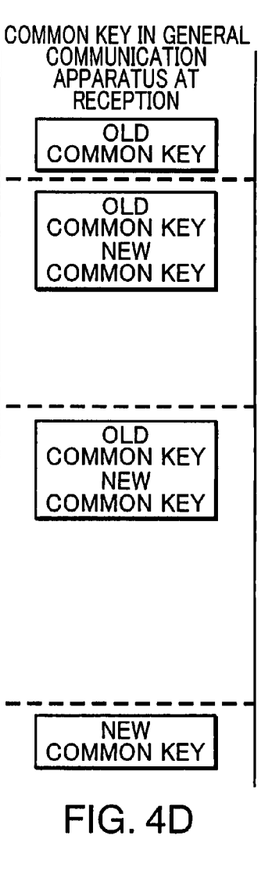
FIG. 4D shows a common key used when the general communication apparatus decrypts reception data.

FIGS. 4A to 4D are views showing the common key update sequence; FIG. 4A shows the common key update sequence, FIG. 4B shows a status of the general communication apparatus, FIG. 4C shows a common key used when the general communication apparatus encrypts transmission data, and FIG. 4D shows a common key used when the general communication apparatus decrypts reception data.

Assume that the status of the general communication apparatus 12 indicates the update completed status in the initial state of the sequence view. In this status, as shown in FIG. 4C, the general communication apparatus 12 encrypts transmission data using the old common key, and decrypts the reception data using the old common key as shown in FIG. 4D.

In Step S1, the common key control apparatus 11 transmits a common key update request R to all the general communication apparatuses 12. The common key update request R includes a new common key. In Step S2, the general communication apparatus 12 receives the common key update request R and transmits a reply A1 to the common key control apparatus 11 in response to the common key update request R. In this instance, as is shown in FIG. 4B, the general communication apparatus 12 makes a transition from the update completed status to the distribution completed status. It should be noted that all the general communication apparatuses 12 present on the network 13 cannot receive the common key update request R simultaneously. Hence, both a general communication apparatus 12 in the update completed status and a general communication apparatus 12 in the distribution completed status are present on the network 13. This state of the network is referred to as a first network state J1.

In the first network state J1, as is shown in FIG. 4C, a general communication apparatus 12 in the distribution completed status encrypts transmission data using the old common key. A general communication apparatus 12 in the update completed status is therefore able to decrypt transmission data that was encrypted by the general communication apparatus 12 in the distribution completed status using the old common key.

The general communication apparatus 12 in the update completed status and the general communication apparatus 12 in the distribution completed status are thus able to transmit and receive encrypted data mutually in the first network state J1.

In Step S3, the common key control apparatus 11 receives the reply A1 transmitted from the general communication apparatus 12. In Step S4, the common key control apparatus 11 transmits a first status transition request R1 to all the general communication apparatuses 12 that have transmitted the replies A1 after the common key update request R was transmitted to all the general communication apparatuses 12.

In Step S5, upon receipt of the first status transition request R1, as is shown in FIG. 4B, the general communication apparatus 12 makes a transition from the distribution completed status to the in-transit status, and transmits a reply A2 to the common key control apparatus 11 in response to the first status transition request R1. It should be noted that all the general communication apparatuses 12 present on the network 13 cannot receive the first status transition request R1 simultaneously. Hence, both a general communication apparatus 12 in the in-transit status and a general communication apparatus 12 in the distribution completed status are present on the network 13. This state of the network is referred to as a second network state J2.

In the second network state J2, as is shown in FIG. 4C, the general communication apparatus 12 in the in-transit state encrypts transmission data using the new common key. Nevertheless, as is shown in FIG. 4D, because the general communication apparatus 12 in the distribution completed status holds the new common key, it is able to decrypt the transmission data.

In addition, in the second network state J2, as is shown in FIG. 4C, the general communication apparatus 12 in the distribution completed status encrypts the transmission data using the old common key. Nevertheless, as is shown in FIG. 4D, because the general communication apparatus 12 in the in-transit status holds the old common key, it is able to decrypt the transmission data.

Consequently, in the second network state J2, the general communication apparatus 12 in the in-transit status and the general communication apparatus 12 in the distribution completed status are able to transmit and receive encrypted data mutually.

In Step S6, the common key control apparatus 11 receives the replay A2 transmitted from the general communication apparatus 12. In Step S7, the common key control apparatus 11 transmits a second status transition request R2 to the general communication apparatuses 12 when it has distributed the new common key to all the general communication apparatuses 12.

In Step S8, upon receipt of the second status transition request R2, the general communication apparatus 12 restores its own status to the update completed status from the in-transit status, and transmits a reply A3 to the common key control apparatus 11 in response to the second status transition request R2.

It should be noted that all the general communication apparatuses 12 present on the network 13 cannot receive the second status transition request R2 simultaneously. Hence, both a general communication apparatus 12 in the update completed status and a general communication apparatus 12 in the in-transit status are present on the network 13. This state of the network is referred to as a third network state J3.

In the third network state J3, as is shown in FIG. 4C, the general communication apparatus 12 in the update completed status encrypts transmission data using the new common key. Hence, as is shown in FIG. 4D, the general communication apparatus 12 in the update completed status is able to decrypt the transmission data that was encrypted by the general communication apparatus 12 in the in-transit status using the new common key.

Also, in the third network state J3, as is shown in FIG. 4C, the general communication apparatus 12 in the in-transit status encrypts transmission data using the new common key. Nevertheless, as is shown in FIG. 4D, because the general communication apparatus 12 in the update completed status holds the new common key, it is able to decrypt the transmission data.

Hence, in the third network state J3, the general communication apparatus 12 in the in-transit status and the general communication apparatus 12 in the distribution completed status are able to transmit and receive encrypted data mutually.

In Step S9, the common key control apparatus 11 receives the reply A3. When the common key control apparatus 11 receives the replies A3 from all the general communication apparatuses 12, all the general communication apparatuses 12 on the network 13 are in the update completed status. The common key update processing is thus terminated.

When the general communication apparatus is a home appliance or a sensor, it is highly likely that the general communication apparatus is not linked to the network in a state where transmissions and receptions of various data are enabled when the common key is updated. In such a case, the common key control apparatus 11 may not set the general communication 12 in the update completed status.

As has been described, by performing the update sequence in response to the status held in the general communication apparatus 12, even in a case where a general communication apparatus 12 in which the common key is updated to the new common key and a general communication apparatus 12 in which the common key is not updated to the new common key are present in the system during the common key update, the general communication apparatuses 12 are able to make communications using the common key. In addition, the general communication apparatus 12 holds both the new common key and the old common key only when the common key distribution status is in the distributed completed status and the in-transit status, and holds the most recent common key alone when the common key distribution status is in the update completed status. The invention is therefore applicable even when the general communication apparatus 12 is a home appliance or a sensor having a small memory capacity.

Figure 5:
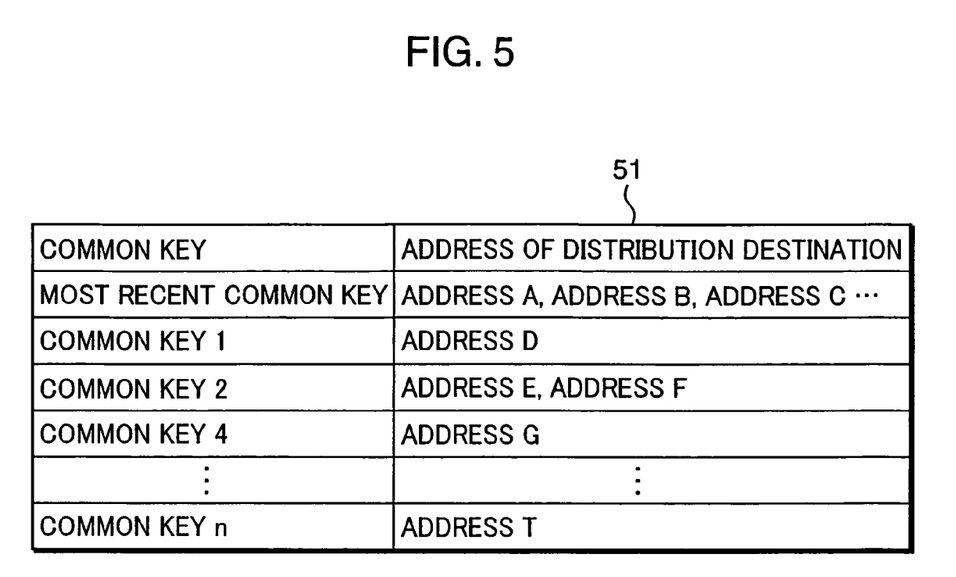
FIG. 5 is a view showing the data structure of a management table shown in FIG. 2.

FIG. 5 is a view showing the data structure of the management table 51 shown in FIG. 2. As is shown in FIG. 5, the management table 51 stores a distribution history of common keys. The management table 51 includes a field of a common key to store data indicating the kinds of common keys, and a field of distribution destination addresses to store addresses of the general communication apparatuses to which respective common keys have been transmitted.

The common key field stores the most recent common key and common key 1 through common key n. The subscripts, 1 through n, added to the end of the common key are numbers indicating how many generations old the common key is with respect to the most recent common key. For example, the common key n indicates that this common key is n generations old with respect to the most recent common key.

Referring to FIG. 5, the general communication apparatuses 12 at an address A, an address B, and an address C hold the most recent common key. The general communication apparatus 12 at an address D holds a common key 1. The general communication apparatuses 12 at an address E and an address F hold a common key 2. There is no general communication apparatus 12 holding a common key 3 within the system. The general communication apparatus 12 at an address G holds a common key 4. As has been described, because the common key control apparatus 11 holds the management table 51, it is possible to encrypt data using the common key held in a general communication apparatus 12 that has not performed common key update processing due to the switching OFF of the power supply or for any other reason and transmit the encrypted data to this general communication apparatus 12.

The management table 51 stores the respective common keys in correlation with the addresses of the general communication apparatuses 12, and an address is assigned uniquely to each general communication apparatus 12. This configuration eliminates the need to hold a record to store a common key that none of the general communication apparatuses 12 holds. Consequently, even when the management table 51 is held in a non-volatile memory or registered and held in a volatile memory, the memory consumption can be reduced.

Figure 6:
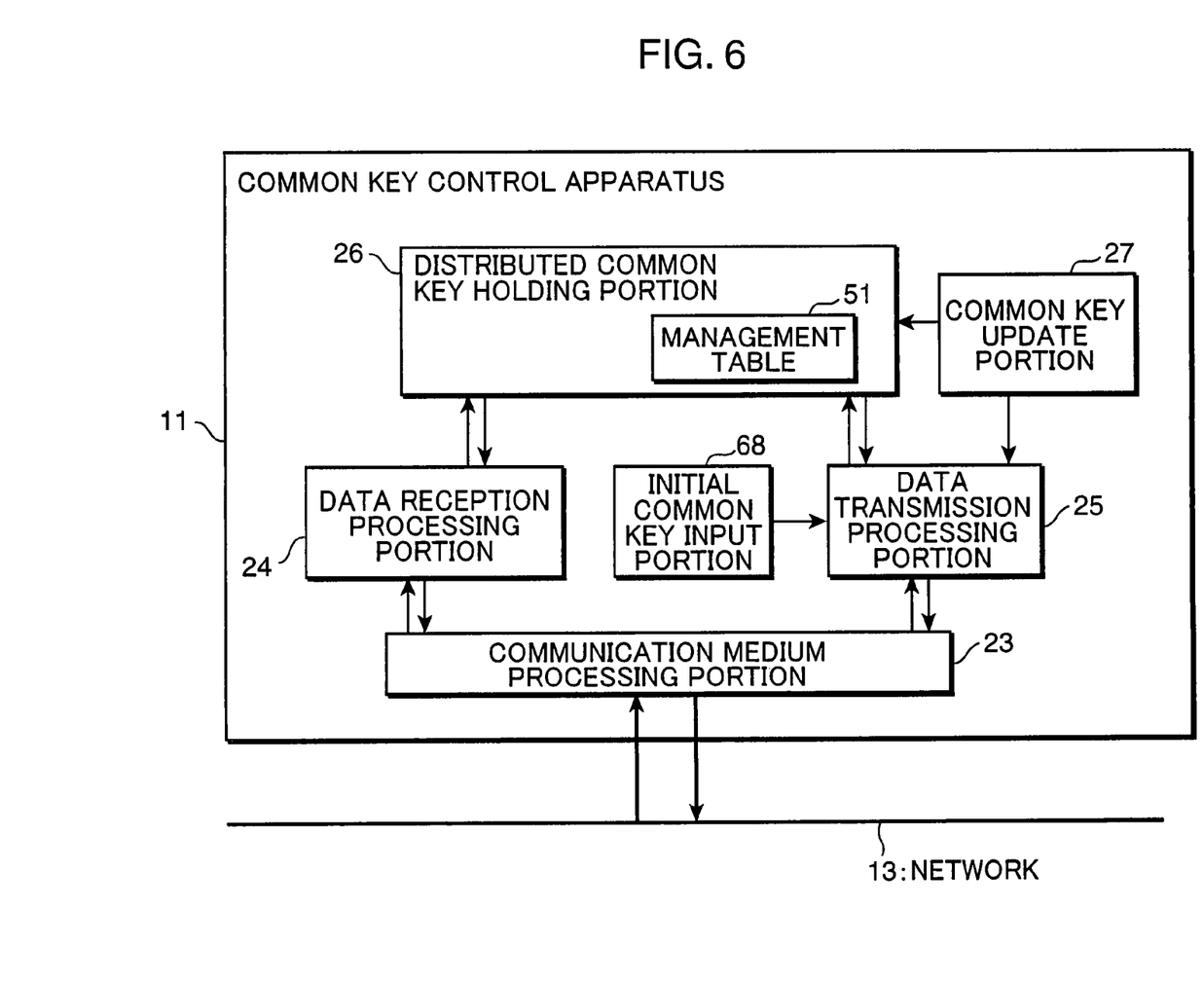
FIG. 6 is a block diagram showing the configuration when an initial common key input portion is additionally provided to the block diagram showing the configuration of the common key control apparatus shown in FIG. 2.

FIG. 6 shows a block diagram showing the configuration in which an initial common key input portion 68 is additionally provided to the block diagram of the common key control apparatus 11 shown in FIG. 2. The initial common key input portion 68 is used to input an initial common key, which is a common key held in a general communication apparatus 12 whose address is not registered in the management table 51. The common key control apparatus 11 is thus able to encrypt the most recent common key using the input initial common key, and transmit the most recent common key to the general communication apparatus 12 holding the initial common key. It is thus possible to transmit the most recent common key to the general common apparatus 12 while preventing the theft of the most recent common key by a third party.

As the initial common key input portion 68, a keyboard, a touch panel, and a mouse can be adopted. It should be appreciated, however, that the initial common key input portion 68 is not limited to these components. For example, when the general communication apparatus 12 holding the initial common key is a home appliance or the like, a light-receiving portion capable of receiving a signal transmitted from the remote controller of the home appliance may be adopted. In this case, the user is able to input the initial common key by manipulating the remote controller of the home appliance.

In a case where a code, such as a serial number, and a bar-code are printed on the housing of the general communication apparatus 12 holding the initial common key, or a code, such as a serial number, and a bar-code are printed on a box packaging the general communication apparatus 12, and the initial common key is generated using these code and bar-code in accordance with a certain computational expression, a device that recognizes the codes, such as a bar-code reader and an OCR, may be adopted as the initial common key input device 68, so that the code and the bar-code are read using such a device to generate the initial common key on the basis of the code and the bar-code thus read. In this case, the initial common key input device 68 needs to pre-store the certain computational expression.

Further, as the initial common key input portion 68, a storage medium driving device that reads out data from a recording medium, for example, an SD card, a flexible disc, and a CD-R, may be adopted. In this case, once the initial common key is stored in the recording medium, the initial common key can be acquired from the recording medium.

Figure 7:
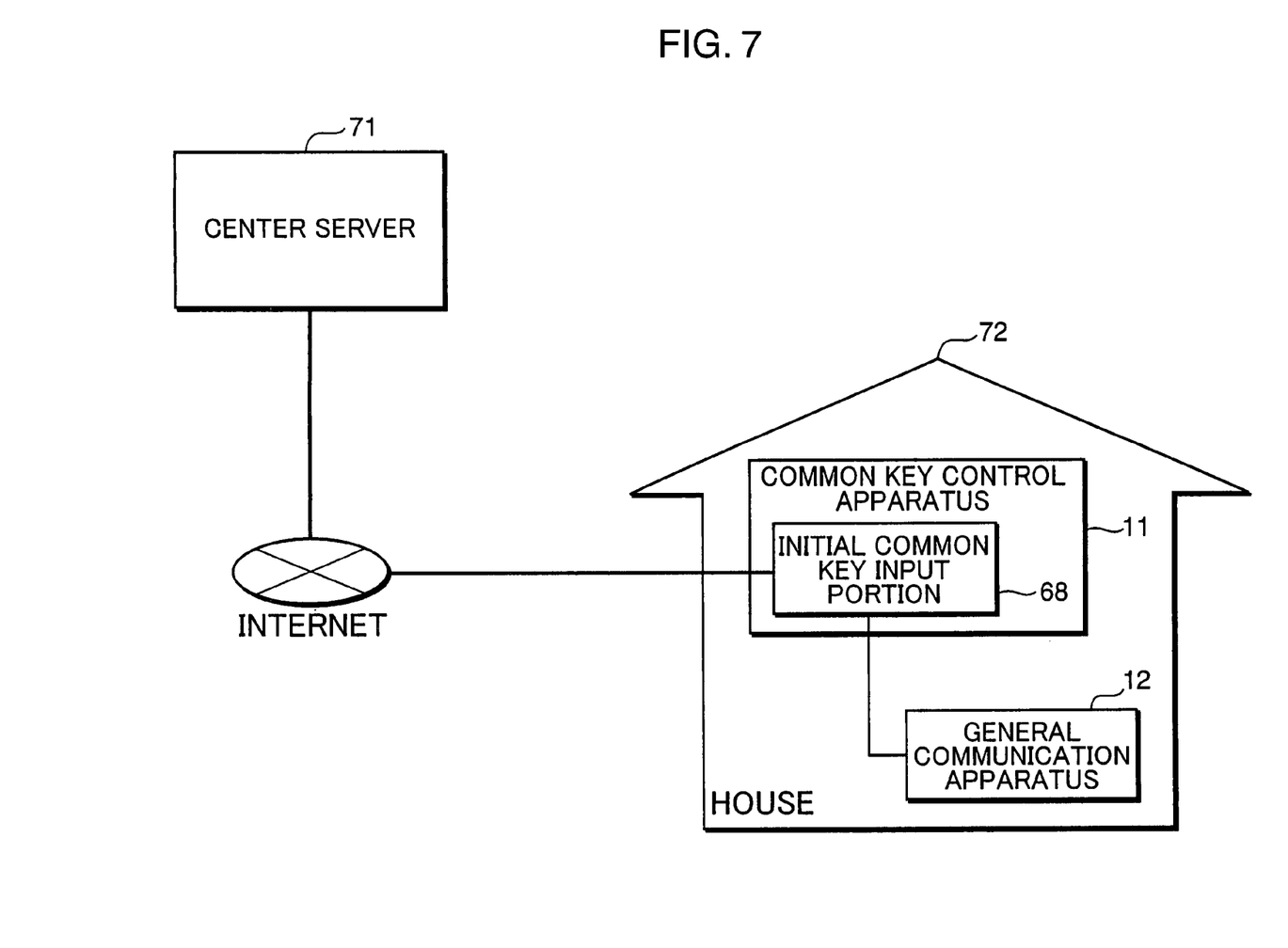
FIG. 7 is a view showing a concrete example of the communication system.

A concrete example of the communication system is shown in FIG. 7. In the communication system shown in FIG. 7, a center server 71 is installed outside a house 72. The common key control apparatus 11 and the general communication apparatus 12 are installed inside the house 72. The center server 71 is connected to the common key control apparatus 11 via the Internet.

The center server 71 holds various kinds of information about the common key control apparatus 11 and the general communication apparatus 12. Initially, the initial common key input portion 68 acquires information about the general communication apparatus 12, such as a manufacturer code, a product code, a serial number, and a date of manufacture, from the general communication apparatus 12 at the distribution destination of the common key. The common key control apparatus 11 then transmits the information thus acquired to the center server 71. The center serer 71 generates an initial common key by performing a computation using the transmitted information in accordance with the pre-determined computational expression, and transmits the initial common key to the common key control apparatus 11. The common key control apparatus 11 thus acquires the initial common key.

It should be noted that data transmitted and received between the center server 71 and the house 72 to acquire the initial common key needs to be encrypted to make it impossible for a third party to figure out the communication content should he eavesdrop the communications.

Figure 8:
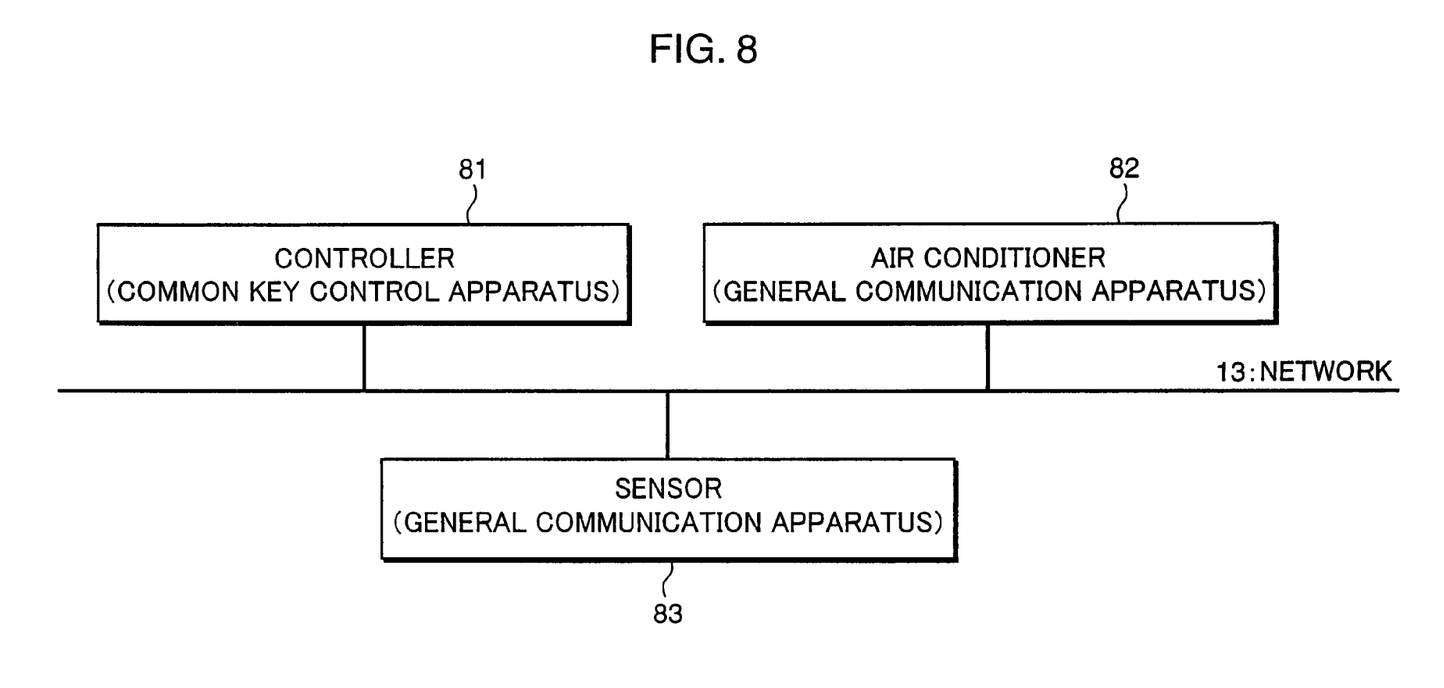
FIG. 8 is a block diagram showing the configuration when the communication system is actually applied to a home network.

A case where the communication system is actually applied to the home network will be described with reference to FIG. 8. The communication system shown in FIG. 8 includes a controller 81, an air conditioner 82, and a sensor 83. The controller 81 corresponds to the common key control apparatus 11 shown in FIG. 1, and the air conditioner 82 and the sensor 83 correspond to the general communication apparatuses 12 shown in FIG. 1.

When the sensor 83 detects a detection object, it sets the detection status to a detected status, and transmits operation start request data to the air conditioner 82. Meanwhile, when the sensor 83 does not detect a detection object, it sets the detection status to a non-detected status, and transmits operation stop request data to the air conditioner 82.

Firstly, a case where the common key is updated in order of the air conditioner 82 and the sensor 83 will be described. Assume that the sensor 83 is in the update completed status and the air conditioner 82 is in the distribution completed status in the initial state.

In the initial state, when the detection status of the sensor 83 changes from the non-detected status to the detected status, because the sensor 83 does not hold the new common key, it encrypts the operation start request data using the old common key and transmits the encrypted data to the air conditioner 82. In this instance, because the air conditioner 82 is in the distribution completed status, the air conditioner 82 tries to decrypt the received operation start request data using the new common key. Upon judging that the new common key is different from the common key used for encryption, it decrypts the operation start request data using the old common key. The air conditioner 82 is thus able to receive the operation start request data from the sensor 83.

Subsequently, upon receipt of the new common key transmitted from the controller 81, the sensor 83 makes a transition from the update completed status to the distribution completed status. The controller 81 then transmits the first status transition request R1 to the air conditioner 82 and the sensor 83. Herein, assume that the detection status of the sensor 83 changes to the non-detected status after the air conditioner 82 receives the first status transition request R1 and before the sensor 83 receives the first status transition request R1, that is, when the air conditioner 82 is in the in-transit status and the sensor 83 is in the distribution completed status. Then, because the sensor 83 is in the distribution completed status at this point, it encrypts the operation stop request data using the old common key and transmits the encrypted data to the air conditioner 82.

Upon receipt of the operation stop request data, the air conditioner 82, being in the in-transit status, tries to decrypt the received operation stop request data using the new common key. Upon judging that the new common key is different from the common key used for encryption, it decrypts the reception data using the old common key. The air conditioner 82 is thus able to receive the operation stop request data from the sensor 83.

Subsequently, the sensor 83 receives the first status transition request R1 from the controller 81 and makes a transition to the in-transit status. The controller 81 then transmits the second status transition request R2 to the air conditioner 82 and the sensor 83. Assume that the second status transition request R2 is received by the air conditioner 82 and the sensor 83 in this order. Also, assume that the detection status of the sensor 83 changes to the detected status after the air conditioner 82 receives the second status transition request R2 and before the sensor 83 receives the second status transition request R2, that is, when the air conditioner 82 is in the update completed status and the sensor 83 is in the in-transition status. Then, the sensor 83, being in the in-transit status, encrypts the operation start request data using the new common key and transmits the encrypted data to the air conditioner 82. Upon receipt of the data, the air conditioner 82, being in the update completed status, decrypts the received operation start request data using the new common key. The air conditioner 82 is thus able to receive the operation start request data from the sensor 83.

A case where the common key is updated in the sensor 83 and the air conditioner 82 in this order will now be described. Assume that the air conditioner 82 is in the update completed status, and the sensor 83 is in the distribution completed status in the initial state.

In the initial state, when the detection status of the sensor 83 changes to the detected status, the sensor 83, being in the distribution completed status, encrypts the operation start request data using the old common key and transmits the encrypted data to the air conditioner 82.

The air conditioner 82 decrypts the received operation start request data using the old common key held therein. The air conditioner 82 is thus able to receive the operation start request data from the sensor 83. Subsequently, upon receipt of the new common key transmitted from the controller 81, the air conditioner 82 makes a transition to the distribution completed status.

Subsequently, the controller 81 transmits the first status transition request R1 to the air conditioner 82 and the sensor 83. Herein, assume that the detection status of the sensor 83 changes to the non-detected status after the sensor 83 receives the first status transition request R1 and before the air conditioner 82 receives the first status transition request R1, that is, when the sensor 83 is in the in-transition status and the air conditioner 82 is in the distribution completed status.

Because the sensor 83 is in the in-transit status at this point, it encrypts the operation stop request data using the new common key and transmits the encrypted data to the air conditioner 82. Upon receipt of the data, the air conditioner 82, being in the distribution completed status, decrypts the received operation stop request data using the new common key, and confirms that the new common key is the same as the common key used for encryption. In this case, there is no need to try to decrypt the reception data using the old common key. The air conditioner 82 is thus able to receive the operation stop request data from the sensor 83. Subsequently, the air conditioner 82 receives the first status transition request R1 from the controller 81, and makes a transition to the in-transit status.

Subsequently, the controller 81 transmits the second status transition request R2 to the air conditioner 82 and the sensor 83. Herein, assume that the detection status of the sensor 83 changes to the non-detected status after the sensor 83 receives the second status transition request R2 and before the air conditioner 82 receives the second status transition request R2, that is, when the sensor 83 is in the update completed status and the air conditioner 82 is in the in-transit status. In this instance, the sensor 83, being in the in-transit status, encrypts the operation stop request data using the new common key and transmits the encrypted data to the air conditioner 82.

Upon receipt of the operation stop request data, the air conditioner 82, being in the update completed status, decrypts the data using the new common key, and confirms that the new common key is the same as the common key used for encryption. In this case, the air conditioner 82 is able to receive the operation start request data from the sensor 83 without having to decrypt the reception data using the new common key.

A phenomenon as above is highly likely to occur in an M:N communication system, such as the home network. Also, when the network has a low rate, it takes a further time to update the common key. However, communications are always enabled among the general communication apparatuses.

The respective blocks shown in FIG. 2 may be achieved by running a program that causes the computer to function as the common key control apparatus on the CPU. Also, the respective blocks shown in FIG. 3 may be achieved by running a program that causes the computer to function as the general communication apparatus on the CPU.

SUMMARY OF THE INVENTION (1) A communication system of the invention includes plural general communication apparatuses each holding an old common key before an update and a common key control apparatus that is connected to each general communication apparatus via a certain network and updates the old common key to a new common key, and is characterized in that the common key control apparatus includes data transmission processing means for transmitting a first status transition request to all general communication apparatuses having made a transition to a distribution completed status, and transmitting a second status transition request to all the general communication apparatuses when the new common key has been distributed to all the general communication apparatuses, and that each general communication apparatus includes: transition means for causing a transition to take place from an update completed status to the distribution completed status upon receipt of the new common key from the common key control apparatus, causing a transition to take place from the distribution completed status to the in-transit status upon receipt of the first status transition request, and restoring the status from the in-transit status to the update completed status upon receipt of the second status transition request; common key holding means for holding a most recent common key alone during the update completed status, and holding both the old common key and the new common key during the distribution completed status and the in-transit status; and encryption means for encrypting data using the most recent common key during the update completed status, encrypting transmission data using the old common key during the distribution completed status, and encrypting the transmission data using the new common key during the in-transit status.

According to this configuration, all the general communication apparatuses are able to decrypt encrypted data in any of the first through third network states; moreover, because the old common key is deleted when all the general communication apparatuses are restored to the update completed status, it is possible to prevent the generation of a period during which not all the general communication are enabled to make mutual communications using encrypted data while at the same time reducing the memory consumption.

(2) In the configuration described above, it is preferable that the common key control apparatus further includes common key update means for generating the new common key using a random number.

According to this configuration, because the new common key is determined by a random number, it is possible to generate a common key that is almost unpredictable.

(3) In the configuration as described above, it is preferable that the common key update means generates the new common key when the number of encryptions of the transmission data or the number of decryptions of reception data using the old common key exceeds a specific number of times.

According to this configuration, because the old common key is updated depending on how many times it is used, the safety of the system can be upgraded further.

(4) In the configuration described above, it is preferable that the common key update means generates the new common key when a sum of the number of encryptions of the transmission data and the number of decryptions of reception data using the old common key exceeds a specific number of times.

According to this configuration, because the old common key is updated when a sum of the number of encryptions and the number of decryptions exceeds a specific number of times, the safety of the system can be upgraded further.

(5) In the configuration described above, it is preferable that the common key update means generates the new common key when a specific time has passed since the update of the old common key.

According to this configuration, because the old common key is updated when a specific period has passed, the safety of the system can be upgraded further.

(6) In the configuration described above, it is preferable that the common key holding means holds a history of common keys transmitted to the general communication apparatuses, and holds a management table that stores respective transmitted common keys in correlation with general communication apparatus information containing addresses of the general communication apparatuses to which the respective common keys are transmitted.

According to this configuration, because the common key holding means manages information as to which general communication apparatus holds how many generations old common key. Hence, even when the power supply of a general communication apparatus holding a common key in the generation before the old common key because its power supply had been kept switched OFF for a long time or for any other reason is switched ON again, the common key control apparatus is able to make a transmission to this general communication apparatus.

(7) In the configuration described above, it is preferable that when data is received from a general communication apparatus whose general communication apparatus information is not stored in the management table, the common key update means generates the new common key and updates common keys held in the general communication apparatuses whose general communication information is stored in the management table to the new common key.

According to this configuration, when a general communication apparatus whose general communication information is not stored in the management table is linked to the network, the most recent common key is transmitted to all the general communication apparatuses. The respective general communication apparatuses can thus share the same common key.

(8) In the configuration described above, it is preferable that the common key control apparatus further includes initial common key input means for inputting an initial common key held in the general communication apparatus when the general communication apparatus is linked to the network.

According to this configuration, because the general communication apparatus includes the initial common key input means for inputting an initial common key held therein when it accesses the network, even when the initial common key is unknown to the common key control apparatus, the common key control apparatus is able to make communications with this general communication apparatus.

(9) It is preferable that the initial common key input means includes at least one of a keyboard, a touch panel, and a mouse.

According to this configuration, because the initial common ken input means comprises a keyboard, a touch panel, a mouse, etc., the user can readily input the initial common key.

(10) In the configuration described above, it is preferable that the initial common key input means includes a remote controller of the general communication apparatus holding the initial common key and a light-receiving portion that receives a signal from the remote controller.

According to this configuration, it is possible to input the initial common key using the remote controller of the general communication apparatus holding the initial common key at the distribution destination of the initial common key.

(11) In the configuration described above, it is preferable that the initial common key input means is a code reading device.

According to this configuration, it is possible to input the initial common key by merely reading a code indicating the initial common key labeled to the housing or the like of the general communication apparatus or onto a bag or a box packaging the general communication apparatus using the code reading device.

(12) In the configuration described above, it is preferable that the initial common key input means is a storage medium driving device.

According to this configuration, when the initial common key is recorded in a recording medium, it is possible to input the initial common key by merely inserting the recording medium in the recording medium driving device.

(13) In the configuration described above, it is preferable that each general communication apparatus further includes common key request means for generating data requesting the common key control apparatus to distribute the new common key, and transmitting the data to the common key control apparatus when a communication disabled state is changed to a communication enabled state.

According to this configuration, when a general communication apparatus that has been in a communication disabled state because the power supply had been switched OFF for a long period or for any other reason is restored to a communication enabled state, data requesting the common key control apparatus to transmit the new common key is generated, and transmitted to the common control apparatus. This enables the general communication apparatus to acquire the new common key. It is thus possible to prevent an event that the update to the new common key is left out.

(14) In the configuration described above, it is preferable that each general communication apparatus further includes decryption means for determining which of the old common key and the new common key was used for encryption of reception data by trying to decrypt the reception data using the old common key and the new common key while its own apparatus is in the distribution completed status.

According to this configuration, under the second network state in which both a general communication apparatus in the distribution completed status and a general communication apparatus in the in-transit status are present, the general communication apparatus in the in-transit status is able to decrypt the encrypted transmission data exactly using the new common key or the old common key.

(15) In the configuration described above, it is preferable that the decryption means determines which of the old common key and the new common key was used for encryption of the reception data by trying to decrypt the reception data using the old common key and the new common key while its own apparatus is in the in-transit status.

According to this configuration, under the second network state in which both a general communication apparatus in the distribution completed status and a general communication apparatus in the in-transit status are present, the general communication apparatus in the in-transit status is able to decrypt the encrypted transmission data exactly using the new common key or the old common key.

(16) In the configuration described above, it is preferable that the decryption means decrypts the reception data using the new common key while its own apparatus is in the second update completed status.

According to this configuration, the general communication apparatus in the update completed status under the third network state is able to decrypt the transmission data encrypted using the new common key exactly using the new common key.

(17) A general communication apparatus of the invention is connected via a communication network to a common key control apparatus that transmits a first status transition request to all general communication apparatuses having made a transition to a distribution completed status and transmits a second status transition request to all the general communication apparatuses when a new common key has been distributed to all the general communication apparatuses, and is characterized by including: transition means for causing a transition to take place from an update completed status to the distribution completed status upon receipt of the new common key from the common key control apparatus, causing a transition to take place from the distribution completed status to the in-transit status upon receipt of the first status transition request, and restoring the status to the update completed status from the in-transit status upon receipt of the second status transition request; common key holding means for holding a most recent common key alone during the update completed status, and holding both the old common key and the new common key during the distribution completed status and the in-transit status; and encryption means for encrypting transmission data using the most recent common key during the update completed status, encrypting the transmission data using the old common key during the distribution completed status, and encrypting the transmission data using the new common key during the in-transit status.

(18) A common key control apparatus of the invention is connected to plural general communication apparatuses via a communication network, each general communication apparatus including: transition means for causing a transition to take place from an update completed status to a distribution completed status upon receipt of a new common key from the common key control apparatus, causing a transition to take place from the distribution completed status to an in-transit status upon receipt of a first status transition request from the common key control apparatus, and restoring the status to the update completed status from the in-transit status upon receipt of a second status transition request from the common key control apparatus; common key holding means for holding a most recent common key alone during the update completed status, and holding both the old common key and the new common key during the distribution completed status and the in-transit status; and encryption means for encrypting transmission data using the most recent common key during the update completed status, encrypting the transmission data using the old common key during the distribution completed status, and encrypting the transmission data using the new common key during the in-transit status, and is characterized in that the common key control apparatus transmits the first status transition request to all general communication apparatuses from which a new common key update reply has been transmitted after a new common key update request was transmitted to all the general communication apparatuses, and transmits the second status transition request to all the general communication apparatuses when the new common key has been distributed to all the general communication apparatuses.

INDUSTRIAL APPLICABILITY

The communication system of the invention enables communications between a device holding an updated common key and a device not holding an updated common key within the system during the update of the common key. In particular, the advantages are remarkable when the communication system is applied to an M:N network, such as a home network. In addition, by managing the common keys using the common key control apparatus of the invention, remarkable advantages can be achieved on a general communication apparatus having a small resource, such as a home appliance.

The invention claimed is:

1. A communication system comprising plural general communication apparatuses each holding an old common key before an update and a common key control apparatus that is connected to each general communication apparatus via a certain network and updates the old common key to a new common key, said common key control apparatus comprising:

data transmission processing means for transmitting a first status transition request to all general communication apparatuses that have made a transition to a distribution completed status, and transmitting a second status transition request to all the general communication apparatuses when the new common key has been distributed to all the general communication apparatuses, and each general communication apparatus comprising:

transition means for causing a transition to take place from an update completed status to the distribution completed status upon receipt of the new common key from the common key control apparatus, causing a transition to take place from the distribution completed status to an in-transit status upon receipt of the first status transition request, and restoring the status to the update completed status from the in-transit status upon receipt of the second status transition request;

common key holding means comprising a memory for holding a most recent common key alone during the update completed status, and holding both the old common key and the new common key during the distribution completed status and the in-transit status; and encryption means for encrypting transmission data using the most recent common key during the update completed status, encrypting transmission data using the old common key during the distribution completed status, and encrypting the transmission data using the new common key during the in-transit status.

2. The communication system according to claim 1, wherein the common key control apparatus further includes:

common key update means for generating the new common key using a random number.

3. The communication system according to claim 2, wherein:

the common key update means generates the new common key when a number of encryptions of the transmission data or a number of decryptions of reception data using the old common key exceeds a specific number of times.

4. The communication system according to claim 2, wherein:

the common key update means generates the new common key when a sum of a number of encryptions of the transmission data and a number of decryptions of reception data using the old common key exceeds a specific number of times.

5. The communication system according to claim 2, wherein:

the common key update means generates the new common key when a specific time has passed as a use period of the old common key.

6. The communication system according to claim 1, wherein:

the common key holding means holds a history of common keys transmitted to the general communication apparatuses, and holds a management table that stores respective transmitted common keys in correlation with general communication apparatus information containing addresses of the general communication apparatuses to which the respective common keys are transmitted.

7. The communication system according to claim 2, wherein:

the common key holding means holds a history of common keys transmitted to the general communication apparatuses, and holds a management table that stores respective transmitted common keys in correlation with general communication apparatus information containing addresses of the general communication apparatuses to which the respective common keys are transmitted, when data is received from a general communication apparatus whose general communication apparatus information is not stored in the management table, the common key update means generates the new common key and updates common keys held in the general communication apparatuses whose general communication information is stored in the management table to the new common key.

8. The communication system according to claim 1, wherein:

the common key control apparatus further includes initial common key input means for inputting an initial common key held in the general communication apparatus when the general communication apparatus is linked to the network.

9. The communication system according to claim 8, wherein:

the initial common key input means includes at least one of a keyboard, a touch panel, and a mouse.

10. The communication system according to claim 8, wherein:

the initial common key input means includes a remote controller of the general communication apparatus holding the initial common key and a light-receiving portion that receives a signal from the remote controller.

11. The communication system according to claim 8, wherein:

the initial common key input means is a code reading device.

12. The communication system according to claim 8, wherein:

the initial common key input means is a storage medium driving device.

13. The communication system according to claim 1, wherein:

each general communication apparatus further includes common key request means for generating data requesting the common key control apparatus to transmit the new common key, and transmitting the data to the common key control apparatus when a communication disabled state is changed to a communication enabled state.

14. The communication system according to claim 1, wherein:

each general communication apparatus further includes decryption means for determining which of the old common key and the new common key was used for encryption of reception data by trying to decrypt the reception data using the old common key and the new common key while its own apparatus is in the distribution completed status.

15. The communication system according to claim 14, wherein:

the decryption means determines which of the old common key and the new common key was used for encryption of the reception data by trying to decrypt the reception data using the old common key and the new common key while its own apparatus in the in-transit status.

16. The communication system according to claim 14, wherein:

the decryption means decrypts the reception data using the most recent common key while its own apparatus is in the update completed status.

17. A general communication apparatus connected via a communication network to a common key control apparatus that transmits a first status transition request to all general communication apparatuses that have made a transition to a distribution completed status and transmits a second status transition request to all the general communication apparatuses when a new common key has been distributed to all the general communication apparatuses, said general communication apparatus comprising:

- transition means for causing a transition to take place from an update completed status to the distribution completed status upon receipt of the new common key from the common key control apparatus, causing a transition to take place from the distribution completed status to an in-transit status upon receipt of the first status transition request, and restoring the status to the update completed status from the in-transit status upon receipt of the second status transition request;
- common key holding means comprising a memory for holding a most recent common key alone during the update completed status, and holding both the old common key and the new common key during the distribution completed status and the in-transit status; and
- encryption means for encrypting transmission data using the most recent common key during the update completed status, encrypting the transmission data using the old common key during the distribution completed status, and encrypting the transmission data using the new common key during the in-transit status.

18. A common key control apparatus connected to plural general communication apparatuses via a communication network, each general communication apparatus including:

- transition means for causing a transition to take place from an update completed status to a distribution completed status upon receipt of a new common key from the common key control apparatus, causing a transition to take place from the distribution completed status to an in-transit status upon receipt of a first status transition request from the common key control apparatus, and restoring the status to the update completed status from the in-transit status upon receipt of a second status transition request from the common key control apparatus;
- common key holding means comprising a memory for holding a most recent common key alone during the update completed status, and holding both the old common key and the new common key during the distribution completed status and the in-transit status; and
- encryption means for encrypting transmission data using the most recent common key during the update completed status, encrypting the transmission data using the old common key during the distribution completed status, and encrypting the transmission data using the new common key during the in-transit status,
- wherein said common key control apparatus transmits the first status transition request to all general communication apparatuses from which a new common key update reply has been transmitted after a new common key update request was transmitted to all the general communication apparatuses, and transmits the second status transition request to all the general communication apparatuses when the new common key has been distributed to all the general communication apparatuses.

* * * * *